May 20, 1952 J. C. LANG 2,597,344
DRIVEN FASTENER AND METHOD OF MAKING THE SAME
Filed Jan. 30, 1948
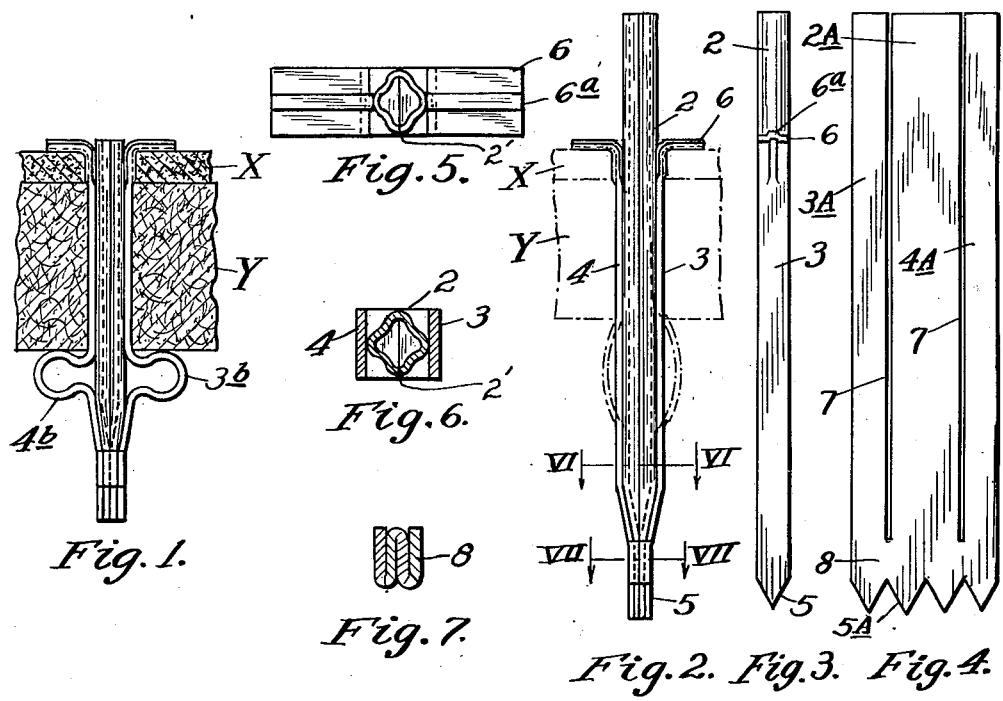
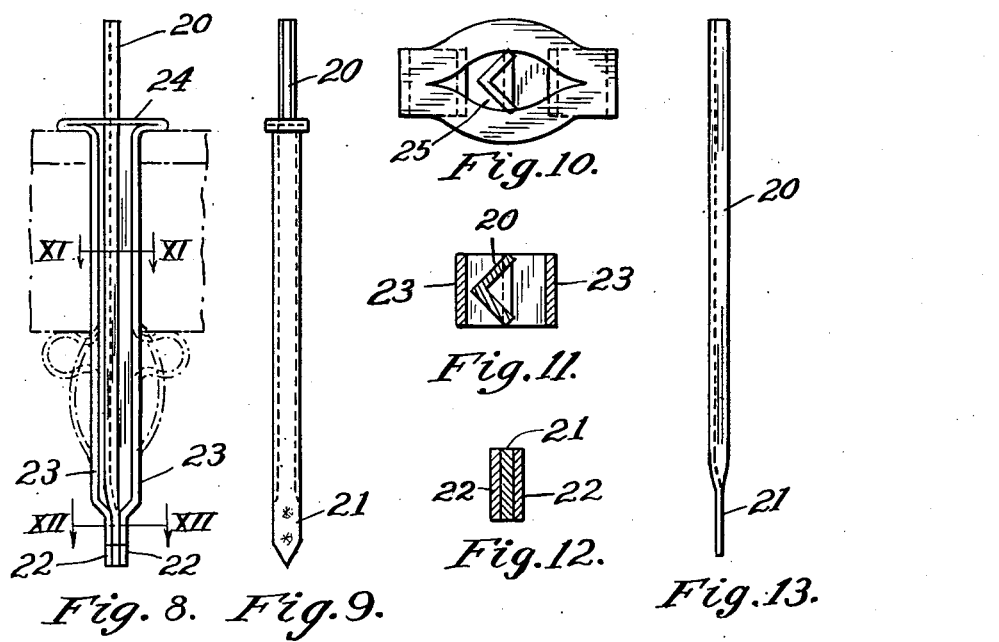
INVENTOR
Joseph C. Lang
BY
Christy, Parmelee & Struttla
ATTORNEYS Patented May 20, 1952

2,597,344

UNITED STATES PATENT OFFICE 2,597,344

DRIVEN FASTENER AND METHOD OF MAKING THE SAME

Joseph C. Lang, Pittsburgh, Pa., assignor to Bocjl Corporation, Pittsburgh, Pa., a corporation of Delaware Application January 30, 1948, Serial No. 5,465

10 Claims. (Cl. 85—37)

This invention is for a fastener designed to be driven by impact or pressure and subsequently manipulated to set or clinch the fastener, and to a method of constructing said fastener.

Frequently it is desirable to secure some thing to a soft base board which is incapable of effectively retaining a nail, and which is so situated that access cannot be afforded at the back of the base for riveting, clinching or otherwise securing any fastener that might be used. For example, asbestos cement shingles are often required to be applied to a house or building having a sheathing of some kind of a pulp or fibrous insulating board. The shingles are drilled with holes through which nails may be passed, but the nails will not hold in the sheathing panels. Hence it is necessary to use boards behind the sheathing or furring strips properly located to render the nails effective. My invention provides a nail-like fastener which may be effectively used in the insulating panel and which is firmly anchored notwithstanding the soft nature of the material into which it is driven. This is but one typical use for my invention, which may be employed in various like environments where an ordinary nail would be ineffective, and while the invention will be herein specifically described in connection with such particular use, it is not confined to such use.

My invention has therefore as its object to provide an effective, cheap and simple fastener designed for use especially where the fastener is to be anchored in a relatively soft material, and for a method of economically making the same.

The fastener of my invention is characterized by the provision of a central stem or shank disposed between a plurality of (preferably two) bendable side members attached only to the point end of the stem, but otherwise unattached to the stem. The stem is slightly longer than the side members, and the free ends of the side members provide a flange or flattened head portion to limit the penetration of the fastener. After the fastener is driven, pressure is applied to the flattened head portion while tension is applied to the stem, tending to retract or withdraw the point of the stem. This causes the side members to bow or bulge outwardly to prevent the fastener from withdrawing and firmly anchor it in place. Following the setting of the fastener the protruding end of the stem may be cut off.

The method involves the bending of or folding of sheet metal to provide the side portions, or the side portions and stem, as will hereinafter more fully appear.

My invention is illustrated in the accompanying drawings, in which:

Fig. 1 shows the completed fastener after it has been set and the excess portion of the stem sheared away, the nail being shown passing through a shingle and insulating board which are shown in section;

Fig. 2 is a side elevation of the original fastener, and the shingle and board are shown in dotted lines;

Fig. 3 is a side elevation of the fastener;

Fig. 4 is a plan view of a blank from which the fastener shown in Fig. 2 is made;

Fig. 5 is a top plan view on a larger scale of the fastener shown in Fig. 2;

Fig. 6 is a transverse section on a larger scale in the plane of line VI—VI of Fig. 2;

Fig. 7 is a transverse section on a larger scale in the plane of line VII—VII of Fig. 2;

Fig. 8 is a view similar to Fig. 2 of a modified form of fastener;

Fig. 9 is a side view of the fastener of Fig. 8;

Fig. 10 is a top plan view on a larger scale of the fastener shown in Fig. 8;

Fig. 11 is a transverse section on a larger scale in the plane of line XI—XI of Fig. 8;

Fig. 12 is a similar section on a larger scale in the plane of line XII—XII of Fig. 8; and Fig. 13 is a side elevation of the stem member forming a part of the fastener of Fig. 8.

Referring to the drawings, and particularly to the form shown in Figs. 1 to 7, the fastener is illustrated as having a central hollow stem portion 2 and two side bars 3 and 4. The lower end of the stem is flattened and pointed, as indicated at 5. The tops of the side bars are turned laterally outward to provide flanges 6 constituting what may be termed the head of the fastener. These outwardly-turned parts are ribbed as indicated at 6a to provide rigidity. As shown, the stem 2 initially projects well above the head-forming portion.

The construction of the fastener may be further understood from the novel method of its manufacture. A piece of flat sheet metal constitutes the original blank. It is slit longitudinally from one end inwardly toward, but not quite to the other end, the slits being designated 7 and the unslitted part is 8. Thus there is a wide central portion or tongue 2A. At each side are narrower tongues, 3A and 4A. The opposite end of the blank is serrated, four teeth 5A being formed. Two of these teeth are symmetrical with respect to the center line of the wide part 2A and the points at each end are on the center line of the portions 3A and 4A respectively.

The blank so formed is then folded on the center line of the portion 2A, the edges of the portion 2A being brought together to form the tubular stem 2. The line where the two edges of the central part come together is designated 2' in Figs. 5 and 6. The unslitted part 8 of the blank is bent to a closed W form, as shown in Fig. 7. This causes the side parts 3A and 4A of the blank to then lie alongside the stem, providing the side bars 3 and 4. This forming of the part 8 to a closed W also brings the four teeth or points 5A into face-to-face or side-by-side relation to produce the single pointed end 5 of the fastener.

Thus it will be seen that my invention provides a novel method of forming the fastener from sheet metal.

In use the fastener as shown in Fig. 2 is driven by the application of a driving force to the upper end of the center pin 2. A hammer may be conveniently used for the purpose. As previously indicated, fasteners of this kind will frequently be used in securing asbestos shingles to insulating board, and in Figs. 1 and 2 such a shingle and insulating board have been illustrated, the shingle being designated X and the insulating board Y. The hole through the shingle is generally preformed. The fastener is of such length that when it is driven until the head-forming portion 6 resists its further penetration, the inner end of the fastener will project well beyond the plane of the inner face of the insulating panel Y. After the fastener is thus driven, a holding pressure is applied to the head-forming element 6 to keep the fastener in place while tension is applied to the stem member 2 to pull it out again toward its original position.

In my copending application Serial No. 11,567, filed February 27, 1948, now Patent No. 2,581,262, issued January 1, 1952, I have shown a specially-formed tool which may be used both as a hammer for driving the fastener, and which may be subsequently used for setting it in the manner herein described. When the center pin or stem is pulled out with the side bars 3 and 4 being held stationary, the side bars will bow or buckle outwardly to the position shown in Fig. 1, where the parts 3b and 4b represent such distorted or buckle portion of the side bars. The insulating panel is usually of such strength that most of the distortion of the side bars will occur at the inner face of the panel. After the stem has been withdrawn in this fastener to adequately set the fastener, the projecting end of the center pin may be cut off flush with the head of the fastener as shown in Fig. 1. The tool described in my application above mentioned may also be operated to cut off the stem. The side bars are formed of a metal, which, upon being deformed in the manner described, will not spring back into the original straight condition.

In Figs. 8 to 13, the structure of the fastener is somewhat modified, but its principle of operation is the same. In these figures there is illustrated a fastener having a center pin 20 which may be of any suitable section, but which as shown in Figs. 10 and 11 has its upper portion bent to the form of an angle or V. The lower part 21 of this stem is flattened and pointed. A strip of sheet metal is bent to an elongated looped form and the bridge of the loop is provided with an eye through which the upper part of the stem 20 passes. In the drawings, this strip of metal has its two end portions 22 spot welded to the point 21 of the stem. Above the point the two sides of the looped strip, designated 23, are spread slightly so as to extend up each side of the central stem. At their upper ends they are bent outwardly and then inwardly, the inwardly-bent portions being united in the bridge or connecting portion 24. The connecting portion 24 has an eye 25 therein through which the stem 20 passes.

While the fastener shown in Figs. 8 to 13 may also be formed from sheet metal stock, as is the fastener first described, seperate strips of metal are employed to form the stem and the side bars. In operation, however, the fastener is used in the same way as described in connection with Figs. 1 to 7, inclusive.

The fastener herein described is relatively cheap and inexpensive to produce, and can be adapted to high speed machine production. A fastener is provided which may be driven like a nail but which, after it has been driven, can be set so that it cannot be withdrawn. The fastener finds special utility where the material, such as the panel Y, is some soft material that would provide insufficient anchorage for a conventional screw or nail. It will be seen that the fastener is a "blind" type of fastener, in that it is manipulated entirely from one end and requires no kind of an anvil or mechanism at the inner end of the fastener.

I have described a fastener having two side bars as this, from a practical standpoint, is symmetrical and provides adequate anchorage. However the number of side bars may be varied.

While I have shown and described certain particular embodiments of my invention, it will be understood that this is by way of illustration and that various modifications and changes may be made within the contemplation of my invention and under the scope of the following claims.

I claim:

1. A fastener of the class described having a stem made up of a plurality of metal parts folded upon one another and terminating at one end in a driving point with all of the parts of the point compacted and permanently secured together, a plurality of side bars permanently connected to the stem at the point portion only and extending upwardly along the stem and terminating below the other end thereof, the unattached portion of the side bars being movable relatively to the stem, the upper ends of the side bars being offset laterally into a head-forming portion which limits the depth to which the fastener may be driven, the stem projecting beyond the upper ends of the side bars and being creased from the point to its end to make the stem more resistant to bending than the side bars under the impacts of being driven.

2. A fastener as described in claim 1 wherein the side bars and head-forming portion constitute an elongated loop of metal with the ends of the loop being attached to the point of the stem, the closed end of the loop having an eye therethrough through which the stem passes.

3. A fastener as described in claim 1 wherein the stem and side bars are parts of an integral sheet of metal, the stem portion comprising a flat strip of sheet metal folded lengthwise upon itself to form double thickness with the fold extending from the point to the top of the stem, the side bars being folded back with a bar at each side of the stem and separated from the stem except at the point.

4. A fastener as described in claim 3 wherein the stem is in the form of a tube-like column, the confronting surfaces of each of the folded metal portions being concave to form such tube.

5. A fastener for anchoring an object to a relatively soft base comprising a central stem with a side bar positioned at each side thereof, said bars being attached to a short bottom portion of the stem only with the attached portions being pointed, compacted and permanently secured together to form a driving point, a short, free end of each side bar being turned to a position normal to the stem to limit the depth to which the fastener may be driven, the stem portion being folded to form a rigid driving member, and the side bars being bendable metal to form locking ears on the side of the base through which the fastener has penetrated.

6. A fastener especially useful for anchoring an object to a relatively soft base comprising a pair of side strips terminating at one end in an abutment, a pointed stem between the side strips projecting at one end beyond said abutment and immovably attached near its pointed end only to the other ends of the side strips, the parts of the stem and the side strips at the pointed end being compacted and welded together.

7. A fastener as defined in claim 6 wherein the abutment connects the side strips and has an eye therein through which the stem passes.

8. The method of forming a fastener which comprises slitting an elongated blank of metal from one end only inwardly toward but not quite to the other end to form a central wide tongue and two side tongues, all connected by the unslitted part near said other end, folding the wide tongue back upon itself axially of the length of the blank and the side tongues back against the folded wide tongue into a closed W shape, creasing said central tongue above the unslitted part to form a tubular section when folded, compacting and permanently securing the W-shaped end portions together to form a driving point, and bending over the free end portions only of the side tongues to form a head.

9. The method defined in claim 8 wherein the bottom edge of the unslitted end of the blank is serrated to form four points that lie in face-to-face relation when the blank is folded to form the driving point.

10. The method of forming a fastener which comprises slitting an elongated blank of metal from one end inwardly toward but not quite to the other end thereof to form a central wide tongue and two side tongues all connected by the unslitted part near said other end, folding the unslitted part axially of the length of the blank into a closed W shape, compressing and permanently securing the four plies of the metal into a driving point, creasing the side tongues near the free ends thereof, and bending the side tongues in the creased portions to form outwardly-turned bending resistant ears.

JOSEPH C. LANG.

REFERENCES CITED

The following references are of record in the file of this patent:

UNITED STATES PATENTS

| Number | Name | Date |
|---|---|---|
| 266,511 | Perkins | Oct. 24, 1882 |
| 964,226 | Farrand | July 12, 1910 |
| 2,148,977 | Buck | Feb. 28, 1939 |
| 2,313,616 | Bowersox | Mar. 9, 1943 |
| 2,317,360 | Cherry | Apr. 27, 1943 |
| 2,333,930 | Hedstrom | Nov. 9, 1943 |
| 2,396,501 | Gibson | Mar. 12, 1946 |
| 2,426,422 | Torresen | Aug. 26, 1947 |
| 2,427,959 | Gisondi | Sept. 23, 1947 |
| 2,498,627 | Hallock | Feb. 21, 1950 |